US007621449B1

(12) United States Patent
Biggins

(10) Patent No.: US 7,621,449 B1
(45) Date of Patent: Nov. 24, 2009

(54) BALLOT COUNTING MACHINE

(76) Inventor: Kevin Biggins, Willingboro, NJ (US); Maria Biggins, legal representative, 55 Northampton Dr., Willingboro, NJ (US) 08046

( * ) Notice: Subject to any disclaimer, the term of this patent is extended or adjusted under 35 U.S.C. 154(b) by 383 days.

(21) Appl. No.: 11/565,583

(22) Filed: Nov. 30, 2006

(51) Int. Cl.
*G06K 17/00* (2006.01)
*G07C 13/00* (2006.01)

(52) U.S. Cl. ...................................................... 235/386

(58) Field of Classification Search ................. 235/386, 235/51, 52, 56; 705/12; 283/5
See application file for complete search history.

(56) References Cited

U.S. PATENT DOCUMENTS

| | | | | |
|---|---|---|---|---|
| 2,750,108 | A * | 6/1956 | Keith | 235/56 |
| 2,922,643 | A * | 1/1960 | Lopez | 271/35 |
| 3,214,092 | A * | 10/1965 | Coyle et al. | 235/51 |
| 3,630,434 | A | 12/1971 | O'Neal | |
| 4,300,123 | A | 11/1981 | McMillin et al. | |
| 4,807,908 | A | 2/1989 | Gerbel | |
| 4,981,259 | A | 1/1991 | Ahmann | |
| 5,610,383 | A | 3/1997 | Chumbley | |
| 6,679,601 | B1 * | 1/2004 | Pham et al. | 347/104 |
| 2002/0092908 | A1 * | 7/2002 | Chumbley | 235/386 |
| 2004/0016803 | A1 * | 1/2004 | Cummings | 235/386 |

FOREIGN PATENT DOCUMENTS

| | | | | |
|---|---|---|---|---|
| JP | 2003162745 | A | * | 6/2003 |
| WO | WO 2004042636 | A1 | * | 5/2004 |

* cited by examiner

*Primary Examiner*—Michael G Lee
*Assistant Examiner*—Suezu Ellis
(74) *Attorney, Agent, or Firm*—Crossley Patent Law; Mark Ashley Crossley

(57) ABSTRACT

A ballot counting system that analyzes a large volume of paper ballots at high speed, with the paper ballots being analyzed for both authenticity and for correctness. The ballot that is used with the ballot counting system has two sections which are mirror images of one another, and when folded, essentially allows an individual to punch out a hole on two boxes (one on each section) when making a selection for a particular candidate. Each hole on the corresponding section of the ballot corresponds to the same candidate. Each section is bar-coded, allowing an individual to separate the two sections after voting and then dropping one of the sections into a ballot box and keeping the other section as a voting receipt. The ballot counting system is fabricated from an outer casing that includes an internal drive belt and a plurality of rollers. The ballots are placed on an ascending bin, where they are loaded into the ballot counting machine on an individual basis. Once in the machine, the bar code is scanned, the ballot is tabulated, and the results of the ballot are analyzed. The ballot then exits the machine and is placed on a descending bin where it then remains until retrieved by an individual.

5 Claims, 4 Drawing Sheets

BALLOT COUNTING MACHINE

BACKGROUND OF THE INVENTION

The present invention concerns that of a new and improved ballot counting machine that analyzes a large volume of paper ballots at high speed, with the paper ballots being analyzed for both authenticity and for correctness.

DESCRIPTION OF THE PRIOR ART

U.S. Pat. No. 5,610,383, issued to Chumbley, discloses a device and method for collecting voting data.

U.S. Pat. No. 4,300,123, issued to McMillin et al., discloses a line scanning camera that generates signal information indicative of marks on a scanned document and a selectable memory containing several document formats cause the signal information from the scanned documents corresponding to the selected format to be transmitted for evaluation.

U.S. Pat. No. 4,981,259, issued to Ahmann, discloses a ballot box that is used in combination with an electronic voter ballot tabulating device which accepts marked paper ballots, tabulates the voter selection thereon and dispenses the tabulated ballots through one of a plurality of exit openings in its bottom side.

U.S. Pat. No. 3,630,434, issued to O'Neal, discloses a compact, lightweight, manually operated voting machine with provisions for straight ticket, selective and write-in voting.

U.S. Pat. No. 4,807,908, issued to Gerbel, discloses a ballot consisting of two or more ballot cards that is held together by means of perforated creases.

SUMMARY OF THE INVENTION

The present invention concerns that of a new and improved method and ballot counting system that analyzes a large volume of paper ballots at high speed, with the paper ballots being analyzed for both authenticity and for correctness. The ballot that is used with the ballot counting system has two sections which are mirror images of one another, and when folded, essentially allows an individual to punch out a hole on two boxes (one on each section) when making a selection for a particular candidate. Each hole on the corresponding section of the ballot corresponds to the same candidate. Each section is bar-coded, allowing an individual to separate the two sections after voting and then dropping one of the sections into a ballot box and keeping the other section as a voting receipt.

The ballot counting system is fabricated from an outer casing that includes an internal drive belt and a plurality of rollers. The ballots are placed on an ascending bin, where they are loaded into the ballot counting machine on an individual basis. Once in the machine, the bar code is scanned, the ballot is tabulated, and the results of the ballot are analyzed. The ballot then exits the machine and is placed on a descending bin where it then remains until retrieved by an individual.

There has thus been outlined, rather broadly, the more important features of a ballot counting system that the detailed description thereof that follows may be better understood and in order that the present contribution to the art may be better appreciated. There are, of course, additional features of the ballot counting system that will be described hereinafter and which will form the subject matter of the claims appended hereto.

In this respect, before explaining at least one embodiment of the ballot counting system in detail, it is to be understood that the ballot counting system is not limited in its application to the details of construction and to the arrangements of the components set forth in the following description or illustrated in the drawings. The ballot counting system is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present ballot counting system. It is important, therefore, that the claims be regarded as including such equivalent constructions insofar as they do not depart from the spirit and scope of the present invention.

It is therefore an object of the present invention to provide a ballot counting system which has all of the advantages of the prior art and none of the disadvantages.

It is another object of the present invention to provide an ballot counting system which may be easily and efficiently manufactured and marketed.

It is another object of the present invention to provide a ballot counting system which is of durable and reliable construction.

It is yet another object of the present invention to provide a ballot counting system which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
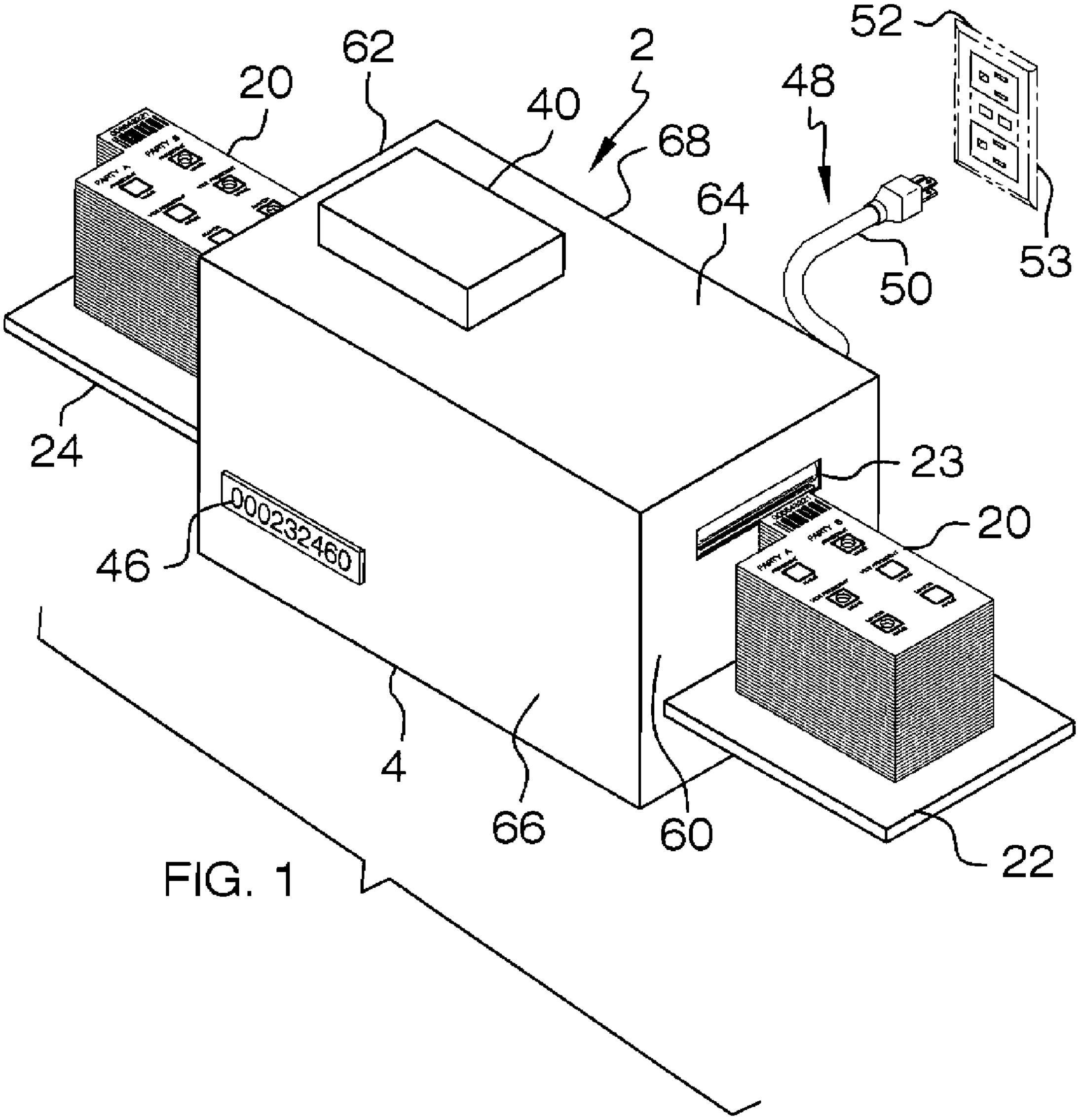
FIG. 1 shows a perspective view of the ballot counting system as it would appear in use.
Figure 2:
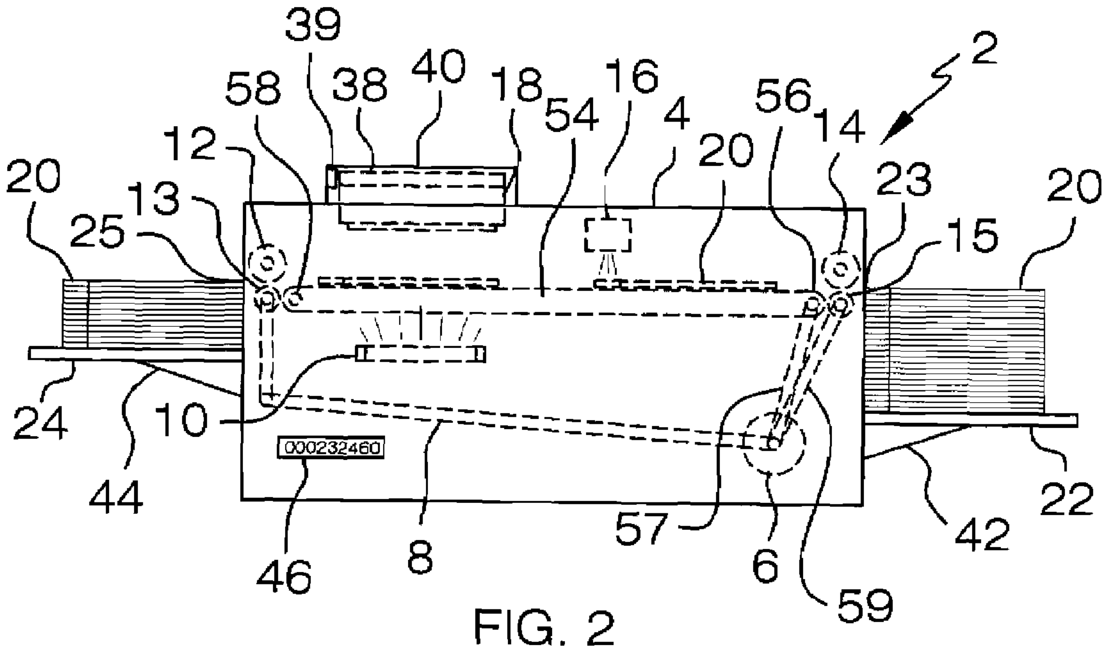
FIG. 2 shows a side cutaway view of the ballot counting system as it would appear in use.
Figure 3:
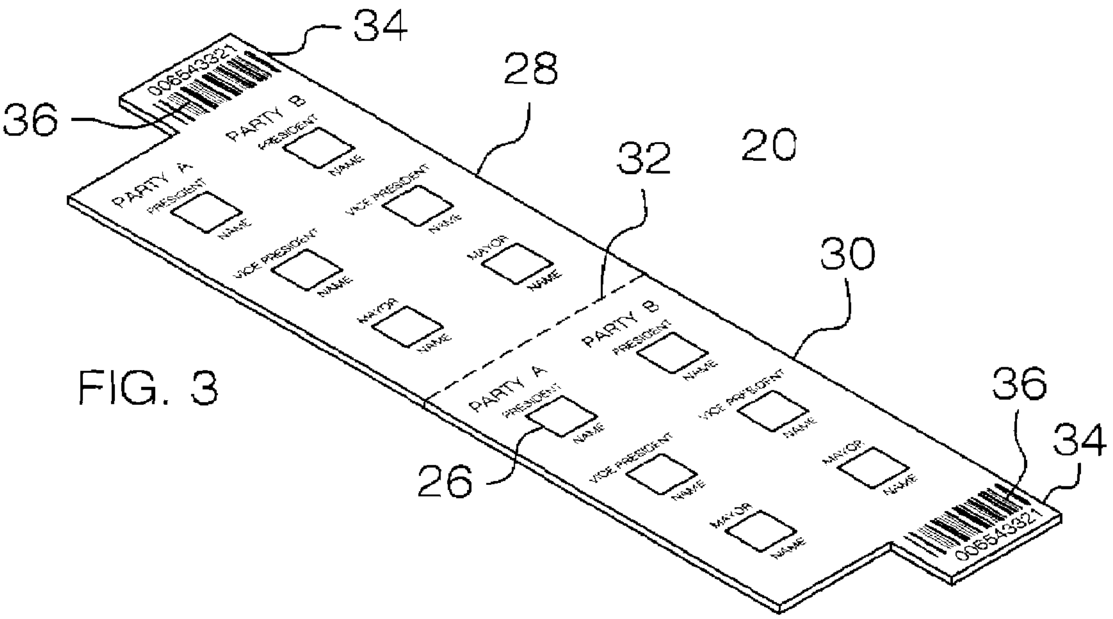
FIG. 3 shows a top perspective view of a paper ballot used in conjunction with the ballot counting system.
Figure 4:
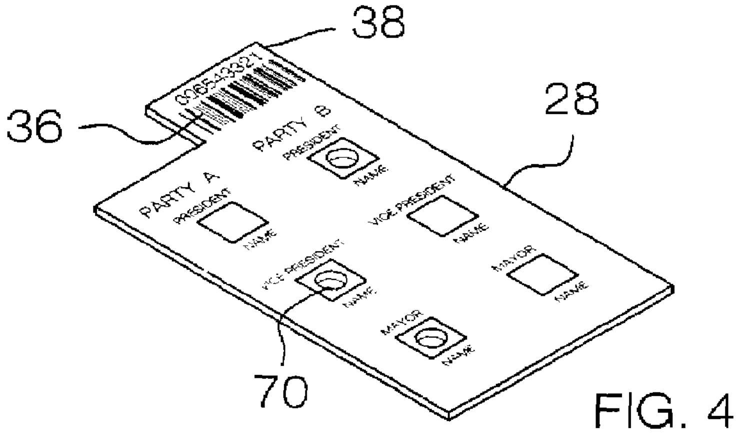
FIG. 4 shows a top perspective view of a section of a paper ballot used in conjunction with the ballot counting system.
Figure 5:
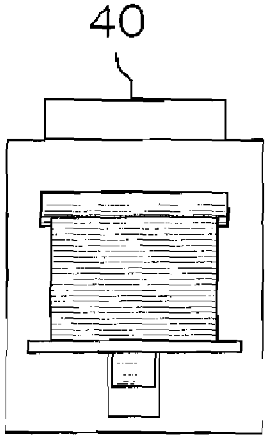
FIG. 5 shows a front end view of the ballot counting system as it would appear in use.
Figure 6:
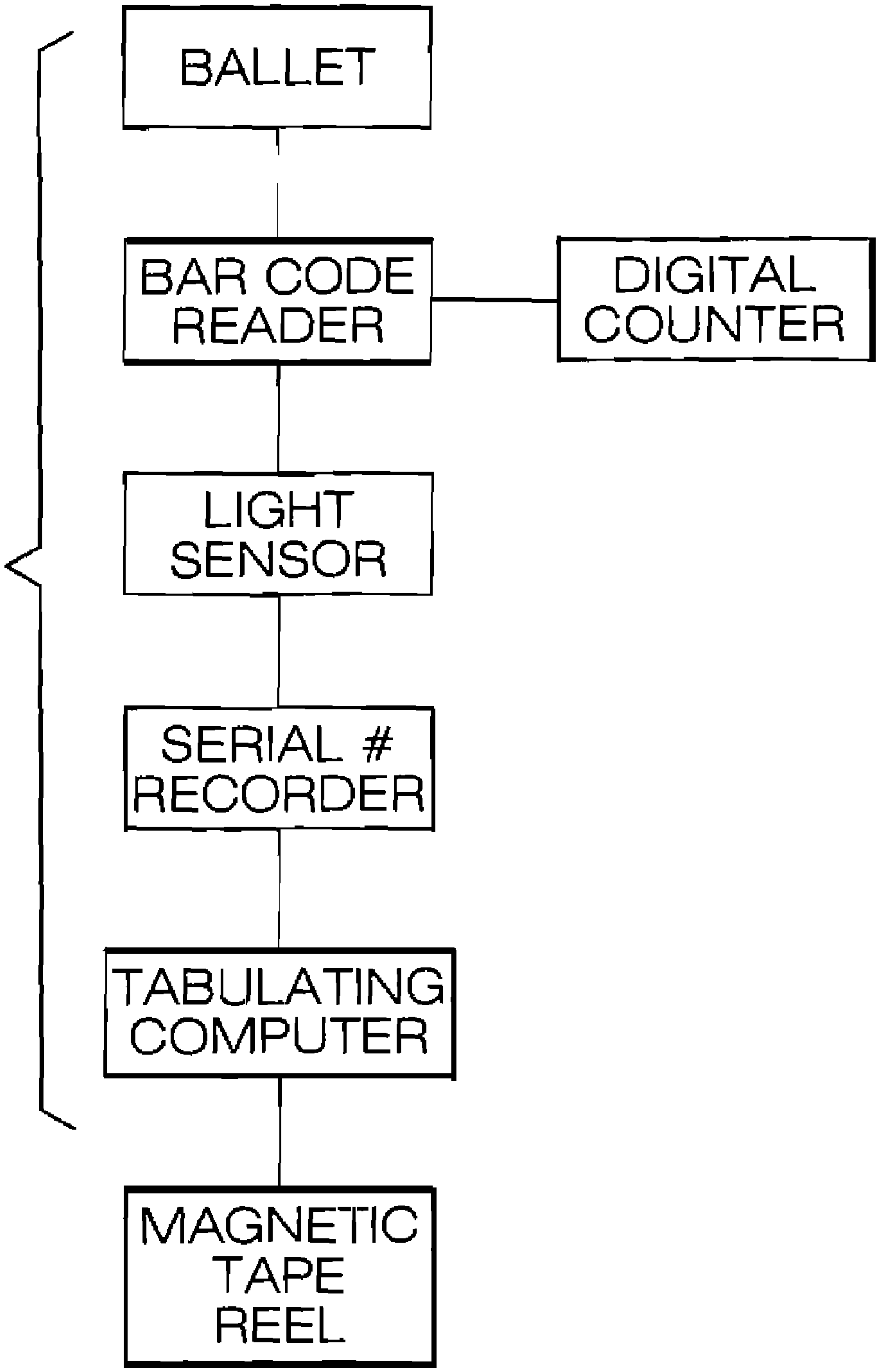
FIG. 6 shows a schematic of the procedures that are performed by the ballot counting system after a ballot is inserted into the ballot counting system.

With reference now to the drawings, and in particular to FIGS. 1 through 6 thereof, a new ballot counting system embodying the principles and concepts of the present invention and generally designated by the reference numeral 2 will be described.

As best illustrated in FIGS. 1 through 6, the ballot counting system 2 comprises an outer casing 4 that is hollow, with an electronic motor 6 being located within the outer casing 4. The electronic motor 6 receives its power through power means 48, which is preferably an electric plug 50 that is attached to an outlet 52 that receives standard household current 53.

The outer casing 4 has two ends, a front end 60 and a rear end 62, and furthermore, has a top surface 64. The outer casing 4 also comprises two sides comprising a front side 66 and a rear side 68.

The electric motor 6 is preferably axially mounted within the outer casing 4. Attached to the electrical motor 6 is at least one belt 8, with the belt 8 being attached to at least one roller, with said roller comprising roller 13, pursuant to FIG. 2. Depending on the configuration, the belt 8 may be attached to additional rollers.

Within system 2 is located a primary belt 54 that has two ends comprising a front end and a rear end. The front end of the primary belt 54 is wound around roller 56 and is located adjacent to the ascending slot 23, which is attached to the front end 60 of the outer casing 4. The rear end of the primary belt 54 is wound around roller 58 and is located adjacent to the descending slot 25, which is attached to the rear end 62 of the outer casing 4. The portion of primary belt 54 that is wound around roller 58 is in contact with roller 13, while the portion of primary belt 54 that is wound around roller 56 is in contact with roller 15. Roller 56 is attached to the electric motor 6 by belt 57, while roller 15 is attached to the electric motor 6 by belt 59.

Light 10 is preferably mounted within outer casing 4 below primary belt 54 and shines upwards. Primary belt 54 is preferably translucent so as to allow light emitted from light 10 to travel through primary belt 54.

A light sensor 18 is mounted on the top surface 64 of the outer casing 4 and captures light emitted from light 10. Light sensor 18 itself is encased by upper casing 40, which is also located on the top surface 64 of outer casing 4 above light sensor 18. Light sensor 18 is connected to magnetic tape 38, which is also located within upper casing 40.

Attached to the front end 60 of the outer casing 4 is an ascending bin 22 onto which a plurality of ballots 20 are placed. The weight of the ballots 20 causes the ascending bin 22, which is supported by ascending support 42, to adjust to a specific height level, with the height level being optimal when the top ballot on the plurality of ballots 20 is located at the height of the ascending slot 23. Once the ballots 20 are placed on the ascending bin 22 and the machine is operating, rollers 15 and 14 (which is contact with roller 15) pull in ballots 20 on an individual basis and pull them onto the primary belt 54, where they proceed lengthwise in the outer casing 4.

Each ballot 20 comprises two sections comprising a top section 28 and bottom section 30, with the two sections being separated by a perforation line 32. Each section comprises a plurality of boxes 26, with each box in a particular section designed to represent a particular candidate. When the perforation line 32 is folded over and the top section 28 and the bottom section 30 are placed flush against one another, each set of boxes that overlap one another are for the same candidate. This way, an individual can punch out a hole 70 in each of the two relevant boxes for a particular choice when one movement.

After the individual would make their voting choices, they would then proceed to tear the ballot 20 in two pieces at the perforation line. They would then keep one of the two sections, while turning the other section into the voting officials. This is the section of the ballot 20 that gets placed, along with all the other turned-in ballot sections, on the ascending bin 22.

Each section of each ballot 20 has an extension 34 on which a bar code 36 is located. Once each ballot section 20 on the ascending bin 22 is pulled into the outer casing 4 by rollers 14 and 15 and placed on the primary belt 54, a bar code reader 16, mounted on the top surface 64 of the outer casing 4, reads each bar code 36 on the extension 34 portion of the ballot 20 to ensure that the ballot 20 is valid. If it is, the bar code reader 16 sends a message to a counter 46, which is mounted on the front side 66 of the outer casing 4. The counter 46 then increases by one. The counter's goal is to keep track of the number of all valid ballots that are run through a particular system 2 in any given session.

After the ballot 20 is read by the bar code reader 16, it moves to an area in between the light 10 and the light sensor 18. The light sensor 18 is able to "read" the ballot section by analyzing the light patterns that pass through the punched out holes on the ballot 20. This measurement is recorded on a reel of magnetic tape 38, which is connected to the light sensor 18. The magnetic tape 38, in turn, is connected to a tabulating computer 39, which allows connectivity to determine vote totals within a particular system 2.

After the ballot 20 is read by the light 10 and the light sensor 18, it is ejected from the outer casing through descending slot 25 after passing between rollers 12 and 13. Roller 12 is in contact with roller 13.

When each ballot 20 exits the descending slot 25, it lands on the descending bin 24. As more and more ballots 20 land on the descending bin 24, the descending bin 24, which is supported by descending support 44, goes lower and lower to accommodate the ever-increasing number of ballots 20.

After a voting period is closed, the ballots 20 can then be kept as a "backup" to the tabulating computer results. If any discrepancies are present in the tabulating computers, then the ballots 20 for one or more particular machines can be hand-counted to provide a more accurate voting count.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What I claim as my invention is:

1. A ballot counting system comprising:

an outer casing having two ends comprising a front end and a rear end, the outer casing further comprising a top surface, the outer casing further comprising two sides comprising a front side and a rear side, an electric motor mounted within the outer casing, at least one belt attached to the electric motor, a first roller located within the outer casing, the first roller being attached to the belt, the first roller being located near the rear end of the outer casing, a plurality of voting ballots, an input mechanism attached to the outer casing, an output mechanism attached to the outer casing, a voting ballot counting mechanism located within the outer casing, the voting ballot counting mechanism designed to count each voting ballot inserted into the input mechanism, a voting analysis mechanism located within the outer casing, the voting analysis mechanism designed to analyze each voting ballot inserted into the input mechanism, power means for providing power to the ballot counting system, wherein the ballot counting system further comprises:

a front roller located within the outer casing, the front roller being located near the front end of the outer casing, a rear roller located within the outer casing, the rear roller being located near the rear end of the outer casing, a primary belt located within the outer casing, the primary belt being wound around the front roller and the rear roller, a second roller located within the outer casing, the second roller being located near the front end of the outer casing, wherein a portion of the primary belt is in contact with the first roller and the front roller, and further wherein a portion of the primary belt is in contact with the second roller is also in contact with the rear roller, wherein the input mechanism of the ballot counting system further comprises:

an ascending bin associated with the front end of the outer casing, means for mounting the ascending bin onto the front end of the outer casing, and a front upper roller located within the outer casing, the front upper roller being located near the front end of the outer casing, wherein the front upper roller is in contact with the second roller, wherein the output mechanism of the ballot counting system further comprises:

a descending bin associated with the rear end of the outer casing, means for mounting the descending bin onto the rear end of the outer casing, and a rear upper roller located within the outer casing, the rear upper roller being located near the rear end of the outer casing, wherein the rear upper roller is in contact with the first roller, wherein the voting ballot further comprises:

a top section, a bottom section removably attached to the top section, a perforated line in between the top section and the bottom section, a plurality of boxes on the ballot, each box representing a particular voting choice for an individual, wherein the top section and the bottom section can be folded on top of one another, causing boxes on the top section and boxes on the bottom section to overlap, and further wherein punching a hole on a particular box after the top section and the bottom section of the voting ballot have been folded on top of another causes two boxes, one on each of the top section and the bottom section, to acquire holes, with said two boxes representing the same voting choice.

2. A ballot counting system according to claim 1 wherein each section of each voting ballot further comprises:

(a) an extension section, and (b) a bar code attached to each extension section.

3. A ballot counting system according to claim 2 wherein the ballot counting mechanism further comprises (a) a bar code reader mounted on the top surface of the outer casing, (b) a counter attached to the front side of the outer casing, (c) wherein the input mechanism pulls ballots into the outer casing from the ascending bin one by one and deposits them on the primary belt, (d) further wherein the ballot eventually winds up underneath the bar code reader while resting on the primary belt, (e) further wherein the bar code reader analyzes the bar code on the extension on the section of the voting ballot, (f) further wherein the bar code reader sends a message to the counter if the bar code reader determines that the ballot is valid, (g) further wherein the counter increases by a count of one if it receives a signal from the bar code reader.

4. A ballot counting system according to claim 3 wherein the voting analysis mechanism further comprises:

(a) a light mounted within the outer casing, (b) a light sensor mounted on the top surface of the outer casing, the light sensor being mounted over the light, (c) a length of magnetic tape attached to the light sensor, (d) a tabulating computer attached to the length of magnetic tape, (e) wherein the primary belt is translucent to allow light to travel from the light to the light sensor, (f) further wherein each ballot, after being analyzed by the voting ballot counting mechanism, travels to a location in between the light and the light sensor, (g) further wherein the light sensor analyzes the light pattern created by the light shining through the various punched out holes on the ballot and records this measurement on the magnetic tape, (h) further wherein the magnetic tape reports its results on an ongoing basis to the tabulating computer, (i) further wherein the ballot is then emitted from the outer casing through the output mechanism onto the descending bin.

5. A ballot counting system according to claim 4 wherein the power means for providing power to the ballot counting system further comprises:

(a) a plug attached to the electric motor, (b) a wall outlet, the wall outlet being connected to a standard electrical supply, (c) wherein the plug can be attached to the wall outlet to receive electricity.

* * * * *